Oct. 21, 1969   N. M. PACKARD ET AL   3,473,209
METHOD TO RELIEVE PIN BORE OF PISTONS
Original Filed Sept. 13, 1965   3 Sheets-Sheet 3
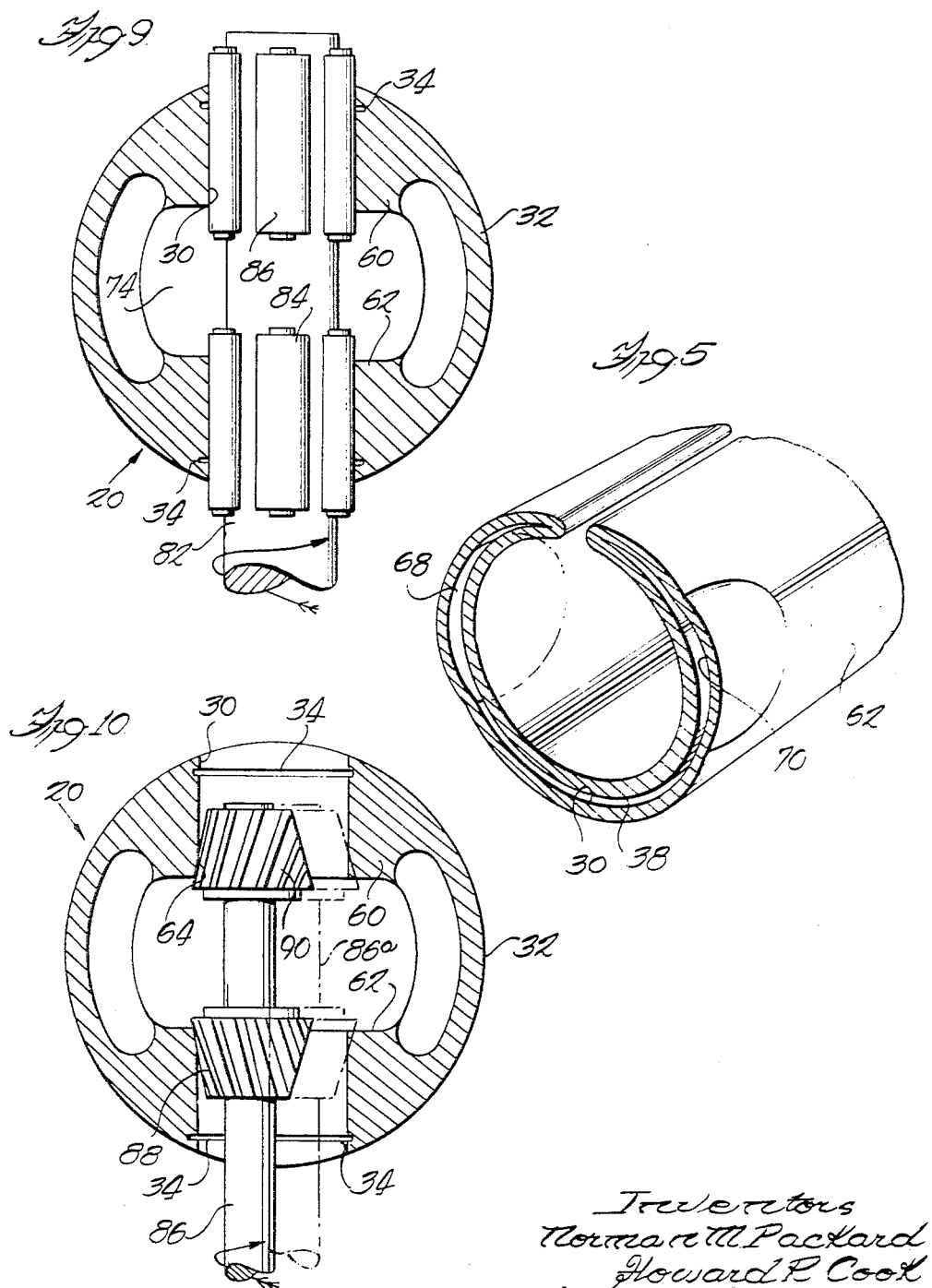

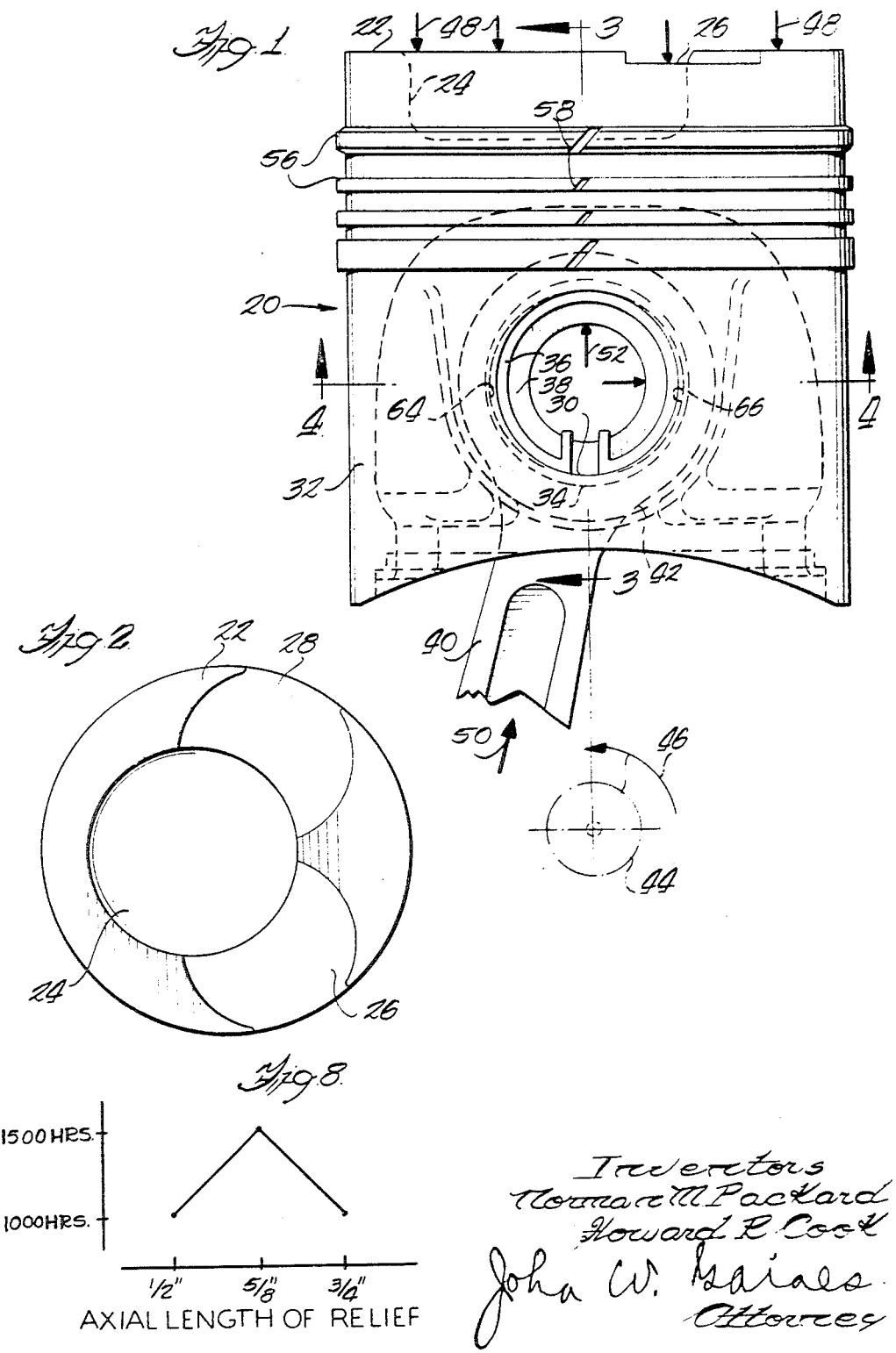

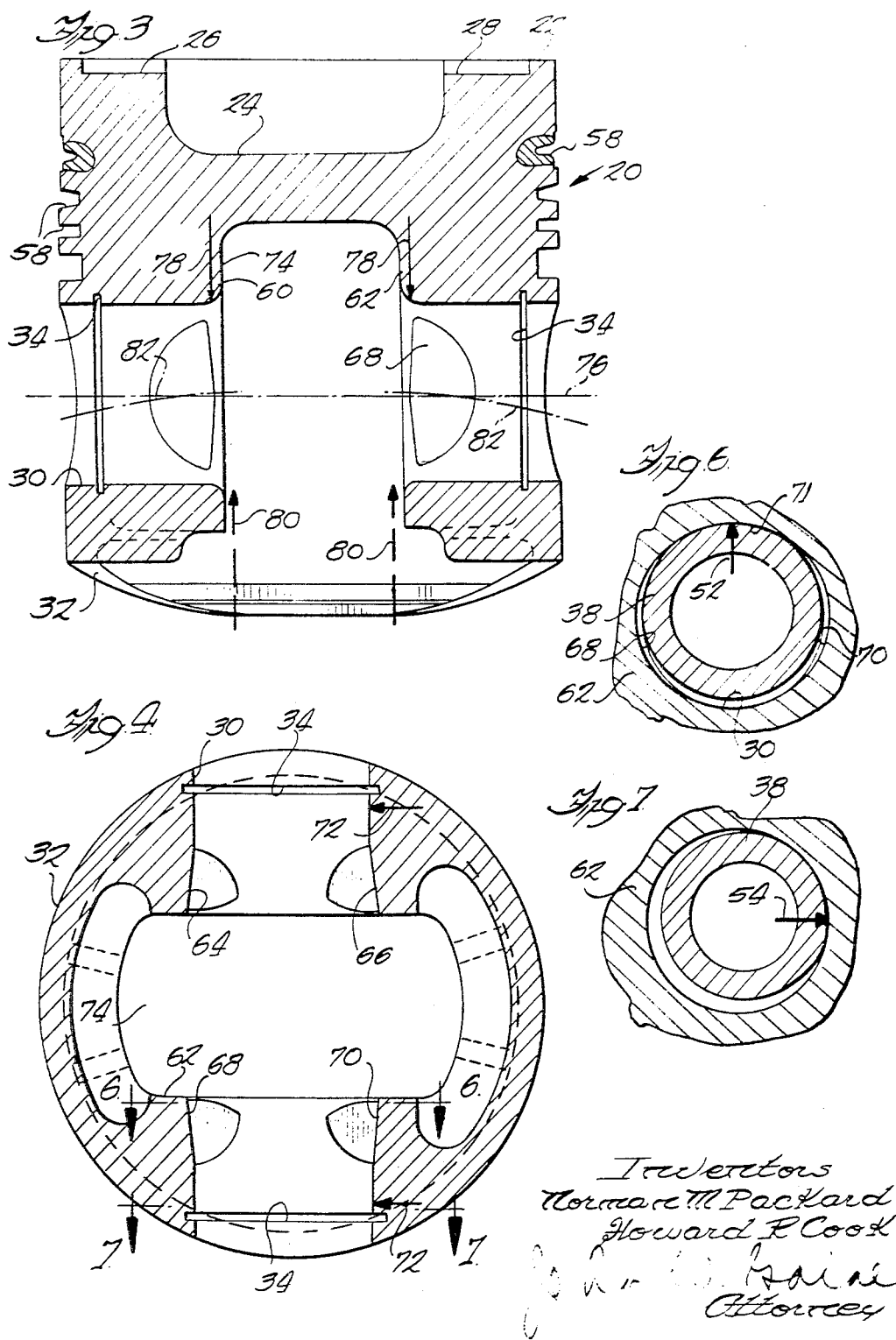

United States Patent Office

3,473,209
Patented Oct. 21, 1969

3,473,209
METHOD TO RELIEVE PIN BORE OF PISTONS
Norman M. Packard, Des Plaines, Ill., and Howard R. Cook, Cape Coral, Fla., assignors to International Harvester Company, a corporation of Delaware
Original application Sept. 13, 1965, Ser. No. 490,154, now Patent No. 3,357,318, dated Dec. 12, 1967. Divided and this application Aug. 14, 1967, Ser. No. 674,028
Int. Cl. B23p *19/04*
U.S. Cl. 29—156.5
4 Claims

ABSTRACT OF THE DISCLOSURE

Method of relieving the pin bore in a piston, by introducing thereinto a rotary cutter means eccentric to the longitudinal axis of the pin bore at the two places on opposite sides of such axis and in a direction which is transverse to the bore and which is perpendicular to the direction of movement of the piston. The cutter means primarily cut the pin boss portions of the bore, and taper in a direction so that the bore, when relieved, is beveled a maximum at the inner end of each pin boss and merges with the bore surface along an arc of intersection at the outer end of the relief falling at approximately 40% of the distance to the corresponding outer end of the bore.

---

This application is a division of Packard and Cook U.S. patent application Ser. No. 490,154 filed Sept. 13, 1965, now U.S. Patent No. 3,357,318.

This invention relates to a piston for engines, and particularly to a partially relieved connection between the wrist pin and the pin bosses in the piston. Each piston is carried at the end of a so-called connecting rod, and the wrist pin forms a pivot joint connecting the two.

We preferably provide pin bore relief to accomplish the purpose of the invention, and desirably the interfitting wrist pin is of a tubular construction, circular in cross section. The selection of where to provide the relief between the coextensive surface of each boss with the wrist pin, and where not to provide relief is based upon careful consideration of the piston problem in an engine, particularly in a relatively high speed, direct injection diesel engine. The compression loads and side thrust loads due to combustion pressures are rather severe.

The immediate problem of concern herein is piston cracking, which occurs at the two points of obvious maximum compressive stress in the wrist pin bore as might be expected, but which is due to a distorting force originating in an altogether different manner and at a separate location in the piston. Many factors are involved in getting at this problem.

The tubular wrist pin constitutes a comparatively small reciprocating mass and a strong, heavy metal is used, which is steel in just about all cases. The piston is a large member and is made of aluminum so as to keep down the overall reciprocating mass and to allow a less stressed, lighter crankshaft and lower bearing loads to be employed. The higher coefficient of thermal expansion of aluminum compared to steel can be seen to manifest itself as a difficulty when the three conditions of the steel pin and aluminum piston are considered. The ambient condition of assembly of the piston and pin is usually room temperature and preferably the pin enters the bore under low pressure or even hand pressure. The maximum diameter of the pin exceeds the bore diameter at most by only 0.0001 inch so as not to interfere with assembly.

In the transient condition beginning at ambient temperature and lasting through cranking and through warm up of the engine to its hot running condition, clearance may or may not develop in the connection between the wrist pin and the bored pin bosses, depending upon the relative rate of warm up of the aluminum metal and the steel metal. In any case, when the piston is subjected to heavy gas pressure loading in the direction of piston movement during warm up, the head load is transmitted between the surface of each boss and the wrist pin on the side of the pin adjacent the head, and is localized precisely at the inner edge of each boss. The period of this transient condition is the most critical period even though a transient one, because of the tendency of the wrist pin to compress or flatten so that the highest stressed portion expands outwardly in a direction perpendicular to the direction of movement of the piston, and possibly before the wrist pin bore has reached its normal maximum dimension attained in the hot running condition of the engine.

In the hot running condition, the wrist pin bore will have expanded to approximately 0.002 inch greater than comparative points of the diameter of the wrist pin, due to the differences in the coefficients of thermal expansion of the two metals referred to. This opening up of an extremely liberal running clearance is not to be desired, but can be readily compensated for as will be explained.

The gas loads within the combustion chamber of the engine cause a side trust to be transmitted between the surface of each boss and the wrist pin on a skirt side of the piston, and impose a head load tending to increase the area of contact between each boss and the wrist pin on the head side. In a piston properly designed according to our invention, the side thrust is transmitted between the outer ends of the wrist pin bosses and the corresponding ends of the wrist pin. The reason is that the maximum flattening or ellipticalness of the wrist pin always localizes at the inner end of the bosses, which must be oversized by relief at the right points in the pin bore to avoid the problem described in connection with warm up. The ellipticalness is used to advantage at the point of maximum compressive stress because of the increase in area of contact where needed.

As viewed at points along its length simultaneously, the piston wrist pin varies in cross section from ellipticalness at the point of maximum compressive stress to substantial circularity at the ends of the pin. As so viewed at that time, the pin ends bend slightly in the direction of piston movement during maximum gas pressure conditions, but the pin restraightens between its ends when unstressed during no-load conditions in its movement.

Without the relief aforementioned, the outwardly expanding elliptical section of the wrist pin which occurs perpendicular to the direction of piston movement would create tension stress at the point of maximum compression on the head side of the wrist pin. Cracking would start in each boss and progress in the direction toward the head; in an exaggerated case of no relief, the two cracks would join and eventually divide the piston into two pieces.

Although there are satisfactory other ways of seeing how to produce the relief, one easy way of visualizing it is to consider a preferred method of piston manufacture provided by our invention. The preferred method, practiced in treating the surface of a wrist pin bore in a piston having a head, having a skirt with the bore cored therein, and having bosses through which the bore passes and which integrally join and reinforce the head and skirt, comprises the steps of work hardening the entire bore before or after machining the bore to a finished surface; beveling the bore on both of the bore sides adjacent the piston skirt by positioning tandem rotary cutters, having equal radii smaller than the pin bore, eccentric to the longitudinal axis of the pin bore at the two places on opposite sides of said axis and in a direction along that transverse axis of the bore which is perpendicular to the normal longitudinal movement of the piston, the cutters being tapered so as to have an increasing diameter in the inward direction; and relieving the bore so that the bevel is maximum at the inner edge of each boss and merge with the bore surface along an arc of intersection at the outer end of the relief falling at no more than approximately halfway to the corresponding outer end of the bore.

The maximum work hardening necessary in the bore goes only to a minor depth in the metal of the pin bosses to satisfactorily handle the compressive stresses therein. We have discovered that work hardening, to an extent substantially in excess of the hardening necessary for compressive stresses, is desirable if not essential in alleviating the piston cracking problem. In other words, selected pin bore relief in conjunction with substantial hardening of the bore materially reduces piston cracking, whereas relief alone or work hardening alone has only minor effectiveness in that regard.

Further features, objects, and advantages of the invention will be specifically pointed out or become apparent when for a better understanding of the invention, reference is made to the following written description taken in conjunction with the accompanying drawings which show a preferred embodiment thereof, and in which:

FIGURE 1 is a rear elevational view of a piston and connecting rod having a connection embodying the present invention;

FIGURE 2 is a top elevational view of the piston appearing in FIGURE 1;

FIGURES 3 and 4 are respectively a longitudinal side elevational view and a bottom plan view taken along the section lines 3—3 and 4—4 of FIGURE 1;

FIGURE 5 is an isometric view schematically illustrating the running clearance and relieved clearance between the opposing metal surfaces of the wrist pin and pin bosses of the piston;

FIGURES 6 and 7 are transverse end elevational views of a detail taken along the section lines 6—6 and 7—7 of FIGURE 4;

FIGURE 8 is a graph showing the life tendencies of pistons having differing amounts of the present pin bore relief;

FIGURE 9 shows a tool work hardening the wrist pin bore in the piston; and

FIGURE 10 shows the actual relieving of the pin bore following work hardening, and yielding the piston construction shown in FIGURE 4.

More particularly in FIGURES 1 and 2 of the drawings, a piston 20 of an engine is shown having a gas-loaded face 22 at the head. A slightly offset cavity 24 in the head functions as a squish chamber at the upper end of the compression stroke of the piston 20 within a cylinder, not shown. Shallow circular recesses 26 and 28 which intersect the squish cavity 24 provides relief in the surface 22 to clear the valves as the piston 20 reaches the upper end of its exhaust stroke.

A transversely disposed wrist pin bore 30 intersects the skirt 32 of the piston at the outer ends of the bore and is unoccupied at the outer ends. Inwardly from each outer end, a snap ring groove 34 is formed in the bore and the grooves carry two snap rings 36 for retaining, between the rings, a hollow steel wrist pin 38. A connecting rod 40 is connected at its piston end 42 to the piston 20 by means of the wrist pin 38, and is connected at the opposite end by means, not shown, to the throw of a crankshaft 44. The direction of rotation of crankshaft, as viewed from the rear in FIGURE 1, is counterclockwise as shown by an arrow 46.

Gas pressure exerted as shown by arrows 48 upon the piston head surface 22 causes a reactive force in the rod 40 indicated by a force vector 50, which vector is conveniently resolved into an upwardly acting component indicated by an arrow 52 and a side thrust component indicated by an arrow 54. A set of piston rings 56 received in grooves 58 at or adjacent the head of the piston 20 cooperates with the cylinder walls, not shown, to prevent the escape of gas from combustion.

In FIGURES 3 and 4, two wrist pin bosses 60 and 62 integrally join together the head of the piston 20 and the skirt 32, reinforcing the two. The pin bore 30 is seen to be relieved on the skirt sides. More specifically, it has two semi-circular relieved areas 64 and 66 adjacent the end of the boss 60, and two semi-circular relieved areas 68 and 70 adjacent the inner end of the boss 62.

When the parts of the engine reach a temperature equivalent to a hot running condition, the aluminum bore in the piston slightly exceeds the wrist pin diameter. The resulting fit between the pin and the bore provides indeed a liberal if not overly liberal, amount of running clearance on the bottom or inertia side of the wrist pin, at a time when the weight of the piston in a static, unstressed condition, established a narrow area or a line of contact at the top or head side of the wrist pin due to the difference in diameters between the pin and the bore.

The clearance relationship just referred to is schematically illustrated in FIGURE 5. The skirt-side areas 68 and 70 in the walls of the bore 30 form wedge-like spaces of relative relief which are far in excess of running clearance. The running clearance on the inertia side of the wrist pin 38, though liberal in amount as indicated, is greatly exaggerated for illustration purposes in FIGURE 5. The relief space at the sides of the pin and bore is seen to disappear in crescent-like converging arcs in the bosses adjacent the piston head and, at least in theory, line contact results due to the bore diameter being in excess of the pin diameter by approximately 0.002 inch.

The most greatly deformed portion of the wrist pin resulting from combustion pressure during the hot running condition is illustrated in FIGURE 6. Each of the relieved areas 68 and 70 is preferably symmetrical to itself about a horizontal plane and each has an arcuate extent of approximately 110°. Consequently, the wrist pin 38 is able to elastically mesh into an elliptical shape from top to bottom, thus conforming to the larger arc of, and being coextensive with, and unrelieved portion 71 of the bore constituting the upper 70° of that bore. Thus, the vertical component 52 of the rod reaction vector, not shown, is not concentrated in a theoretical line contact, but is distributed over an entire arcuate area adjacent the inner end of each of the wrist pin bosses 60 and 62. The major dimension between the relief areas 68 and 70, i.e., the dimension perpendicular to the direction of piston movement, exceeds the corresponding major dimension of the wrist pin 38 when flattened, both during the hot running condition and the warm-up condition of the engine so as to insure clearance during the latter condition.

The bosses 60 and 62 defines a connecting rod slot or cavity 74 so that the piston end 42 (FIGURE 1) of the connecting rod has clearance to oscillate about the wrist pin axis indicated at 76 (FIGURE 3). When gas pressure is maximum on the face 22 of the piston head, the downward force of the piston tends to concentrate in accordance with the arrows shown at 78 in FIGURE 3. Those arrows are on the boss side of the cavity 74 whereas the force of the connecting rod, not shown, upon the wrist pin tends to be slightly inwardly offset so as to concentrate on the rod side of the cavity according to the arrows 80 shown in broken lines. As one phase of distortion, the wrist pin, not shown, bends between its ends along an axis which is indicated at 82 in a somewhat exaggerated fashion. The bending is due to the two force couples created by the offset loading involved, namely, the forces in the direction of the arrows 80 and the opposing forces in the direction of the arrows 78.

In FIGURE 7, the relation of parts is shown under the circumstances of gas pressure bearing down upon and having advanced the piston part way down on its power stroke. Each outer end of the wrist pin 38 which is shown is practically circular in cross section but the pin is bent in its lengthwise direction because of the force couples just described. The piston head side of the wrist pin is pressed in the direction of the pin boss 62, and the wrist pin on one side of the skirt sides, namely, on the thrust side of the skirt, reacts the horizontal component 54 of the connecting rod force, vector directly into the unrelieved coextensive surface of the pin boss 62.

Because of such nonrelief of the bore 30 at the two points involved, the respective pin bosses 60 and 62 provide solid metal backing to the wrist pin ends, as indicated by the arrows 72 thereto in FIGURE 4.

Tests made, though not comprehensive, give definite indications of preferred values for the axial length of the relief areas within each specific wrist pin bore. Pistons of a 4½" size were relieved to various extents in the bore and installed in engines for life tests under conditions which tended to produce piston cracking. The engines were direct injection, high speed diesel engines and they were run not at steady conditions but at periodically varied conditions of speed and load which seem to promote cracking.

The results are represented in graphic form in FIGURE 8. The optimum axial length of relief on the basis of the present results is ⅝" for the 4½" pistons tested. Those pistons were run for 1500 hours under the circumstances described, without a failure. On the other hand, a slightly longer length of relief in the axial direction and a slightly shorter length of relief in the axial direction gave rise to earlier failure of the pistons, some of which cracked without accumulating as much as 1000 hours of running. It is not known what complete test results would show, but it appears to follow that the relief dimensions can be quite critical and that, if the tapered, partial relief is extremely underdone or extremely overdone throughout the full available length of the contact between the bore and wrist pin, optimum life results will not be obtained.

In FIGURE 9, the performance of the work hardening operation of the bore 30 is illustrated. A turning arbor 82 has a set of rotatably mounted rollers 84 around the periphery so as to roll against the bore 30 at one end, and the arbor has another set of rotatably mounted rollers 86 around the periphery so as to rotate against the bore 30 at the opposite end. The metal is work hardened to a depth of several thousandths of an inch, or slightly more, due to the pressure of the rotating rollers as they are revolved about the arbor axis. The contact pressures are not excessive but they are sufficient to work harden the aluminum.

The foregoing operation can be performed with good results after the cored-in bore 30 has been finish machined. The work hardening is not too strenuous, however, because of the possibility that the bore would become out of round or lose its finished dimension.

In case the wrist pin bore 30 is rough machined only, then the work hardening operation is more rigorous and extends for slightly more than several thousands inches in depth within the worked metal of the bosses 60 and 62. Then the bore 30 is finished machined, the cutting or honing being only to a depth of one or two or three thousandths of an inch so as not to machine away the entire depth of work hardened metal.

The relieving operation of the opposite sides of the inner sides of the bore is illustrated in FIGURE 10. Preferably, an arbor 86 carries a pair of tandem beveled cutters 88 and 90 each received in a different end of the bore 30. The adjacent ends of the cutters are the large ends and the relief progresses from the inner end of the bosses so as to taper toward a point of intersection with the unrelieved portion of the bore at the outer end. The arbor 86 rotates and, in the position shown in solid lines in FIGURE 10, pressure is applied so that the teeth on the cutters 88 and 90 relieve the bore, forming the completed areas 64 and 68. The arbor 86 is then moved crosswise into the dotted line position shown by dotted lines 86a and companion areas are relieved on the opposite side of the bore 30. At this point all work of treating the bore 30 is completed.

The respective diameters of the cutters and the wrist pin bore very nearly equal one another, but the difference therebetween is greatly exaggerated in FIGURE 10 to emphasize the effect. So also the bevel on the tapered cutters is greatly exaggerated and the bevel of the relieved surface areas is greatly exaggerated.

Following is an example of a more complete set of specification in connection with one piston referred to:

| | |
|---|---|
| Piston diameter _____ in__ | 4.500 |
| Wrist pin bore diameter _____ in__ | 1.625 |
| Wrist pin bore length _____ in__ | 4.500 |
| Representative angles of face of cutter (bevel) relative to wrist pin bore axis ____ | 1°55', 2°17' 2°52' |
| Representative angles of taper of relief | 1°55', 2°17' 2°52' |
| Diameter of cutter along portion which is first in contact with bore _____ in__ | 1.525 |
| Depth of penetration of that portion of cutter (max. relief depth) _____ in__ | 0.025 |
| Arcuate length of relief circumferentially ___deg__ | 110 |
| Length of relieved area axially _____ in__ | 0.625 |
| Wrist pin length _____ in__ | 3.750 |
| Distance between snap ring grooves 34 _____ in__ | 3.765 |
| Distance rig groove 34 to inner end of adjacent boss _____ in__ | 1.070 |
| Offset of wrist pin hole from piston center line toward non-thrust side _____ in__ | .060 |
| Volume of cavity 24 _____ cc__ | 61.06 |
| Piston rings _____ | 4 |

In the piston as herein disclosed, a floating wrist pin is used, having running clearance with respect to both the rod and the pin bosses so as to be free to rotate therein. The wrist pin is generally circular in cross section and, irrespective of its rotated position, the pin always tends to flatten on the extreme piston head side and on the extreme inertia load side thereof, i.e., it flattens perpendicular to the direction of piston motion. The relieved areas in the bore, consistent with the foregoing, are at all times perpendicular to the direction of travel of the piston because neither the relieved areas of the bore nor the piston have an appreciable rocking motion. The present improvement in alleviating piston cracking is believed to reside in the location and shape of the particular two wedge-like spaces which result, and which provide no full length taper throughout the bore. Instead, the relieved bore areas merge with the bore surface along a semi-circular arc of intersection (technically, a parabola) at the outer end of the relief falling at no more than approximately halfway to the corresponding outer end of the bore. The best results actually observed in some incomplete testing occurred when the relieved surface extending from each inner or boss end of the bore toward the outer end was 43% of the distance from the boss end to the outer end of the bore.

What is claimed is:

1. A method of forming the surface of a cored wrist pin bore in a piston having a skirt, and pin bosses joined to same, said method comprising steps of:

beveling the bore on both of the bore sides adjacent the piston skirt by positioning tandem rotary cutters, having equal radii smaller than the pin bore, eccentric to the longitudinal axis of the pin bore at the two places on opposite sides of said axis and in a direction along that transverse axis of the bore which is perpendicular to the direction of movement of the piston;

said cutters being tapered so as to have an increasing diameter in the inward direction; and relieving the bore so that the bevel is maximum at the inner edge of each boss and merges with the bore surface along an arc of intersection at the outer end of the relief falling at no more than approximately halfway to the corresponding outer end of the bore.

2. A method of treating a cored wrist pin bore in a piston having pin bosses, and a head and skirt joined and reinforced by the bosses, said method comprising the steps of:

work hardening the entire surface of the bore before or after finishing the bore surface;

beveling the bore on both of the bore sides adjacent the piston skirt by positioning tandem rotary cutters, having equal radii smaller than the pin bore, eccentric to the longitudinal axis of the pin bore at the two places on opposite sides of said axis and in a direction along that transverse axis of the bore which is perpendicular to the normal direction of piston movement, said cutters being tapered so as to have an increasing diameter in the inward direction; and relieving the bore so that the bevel is maximum at the inner end of each boss and merges with the bore surface along an arc of intersection at the outer end of the relief falling at no more than approximately halfway to the corresponding outer end of the bore.

3. The method of claim 2, the machining of said bore consisting of at least a rough machining step and a finish machining step, said work hardening operation intervening between said machining steps and working the metal to a depth substantially in excess of the finish machining cut.

4. The invention of claim 2:

said wrist pin bore being finish machined and then work hardened in that order, said work hardening being performed with restraint, without forcing the pin bore out of round or forcing the pin bore to appreciably lose its finished dimension.

References Cited

UNITED STATES PATENTS

| | | | |
|---|---|---|---|
| 2,780,505 | 2/1957 | Venner et al. | 29—156.5 |
| 3,123,899 | 3/1964 | Townhill | 29—156.5 |
| 3,237,532 | 3/1966 | Clark | 29—156.5 |
| 3,357,318 | 12/1967 | Packard et al. | 92—187 |

JOHN F. CAMPBELL, Primary Examiner

R. J. CRAIG, Assistant Examiner

U.S. Cl. X.R.

92—187